United States Patent
Lee

(10) Patent No.: US 9,830,282 B2
(45) Date of Patent: *Nov. 28, 2017

(54) EMBEDDED STORAGE DEVICE INCLUDING A PLURALITY OF STORAGE UNITS COUPLED VIA RELAY BUS

(71) Applicant: SK hynix Inc., Icheon-si, Gyeonggi-do (KR)

(72) Inventor: Lian Chun Lee, Zhubei (TW)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,918

(22) Filed: Sep. 21, 2016

(65) Prior Publication Data
US 2017/0010990 A1    Jan. 12, 2017

Related U.S. Application Data

(63) Continuation of application No. 14/090,149, filed on Nov. 26, 2013, now Pat. No. 9,471,529.

(51) Int. Cl.
| | | |
|---|---|---|
| *G06F 13/20* | (2006.01) | |
| *G06F 13/16* | (2006.01) | |
| *G06F 13/42* | (2006.01) | |
| *G06F 13/364* | (2006.01) | |
| *G06F 13/38* | (2006.01) | |
| *G06F 13/36* | (2006.01) | |
| *G06F 13/40* | (2006.01) | |

(52) U.S. Cl.
CPC .......... *G06F 13/1689* (2013.01); *G06F 13/36* (2013.01); *G06F 13/364* (2013.01); *G06F 13/385* (2013.01); *G06F 13/4068* (2013.01); *G06F 13/4252* (2013.01)

(58) Field of Classification Search
USPC .......................... 710/300–315; 711/103, 115
See application file for complete search history.

(56) References Cited

U.S. PATENT DOCUMENTS 9,471,529 B2 * 10/2016 Lee ..................... G06F 13/4252

* cited by examiner

*Primary Examiner* — Raymond Phan
(74) *Attorney, Agent, or Firm* — William Park & Associates Ltd.

(57) ABSTRACT

An embedded storage device for use with a computer device is provided. The embedded storage device includes a microprocessor, a master storage unit, a slave storage unit, and a relay bus. The microprocessor provides a command signal and creates data transmission link to the computer device. The master storage unit has at least a master data pin, and a master control pin. The master control pin receives a command signal from the microprocessor. The slave storage unit has at least a slave data pin. The relay bus is coupled to the master storage unit and the slave storage unit to transmit the command signal from the master storage unit to the slave storage unit.

7 Claims, 4 Drawing Sheets

EMBEDDED STORAGE DEVICE INCLUDING A PLURALITY OF STORAGE UNITS COUPLED VIA RELAY BUS

CROSS-REFERENCES TO RELATED APPLICATION

The present invention is a continuation application of Ser. No. 14/090,149, filed on Nov. 26, 2013, titled "EMBEDDED STORAGE DEVICE", which is incorporated herein by reference in its entirety.

BACKGROUND

1. Technical Field

The present invention relates to embedded storage devices, and more particularly, to an embedded storage device with multiple low-capacity storage units integrated by a relay bus.

2. Related Art

Due to ever-changing storage technology and process techniques, debut of new storage devices never ceases, and thus the storage space and access speed of conventional storage devices are increasing rapidly. To cope with each launch of a new storage device process technique, for example, the improvements in NAND flash memory fabrication as evidenced in its change from a 70 nm process to a 50 nm process, then to a 40 nm process, and eventually to a 30 nm process, electronic product manufacturers have to redesign the operating systems of the electronic products in accordance with the updated process techniques so as to adapt to or manage the novel storage devices. In doing so, any forthcoming launch of a new electronic product model has to be postponed to the detriment of product lifecycle management.

In view of this, the MultiMediaCard Association set forth Embedded MultiMediaCard (eMMC) standards. The eMMC standards aim to simplify use of a storage device installed in an electronic product and integrate both the storage device and a processor into a Multi-Chip Package (MCP) chip. Under the eMMC standards, electronic product manufacturers only need to procure eMMC chips for direct use with the electronic products they developed, thereby dispensing with the hassles of solving the intricate problems with new storage chip compatibility and management, and dispensing with the need to redesign any related peripheral circuit. Hence, the eMMC standards effectively improve electronic product manufacturers' product development schedule, cut product development costs, and speed up the launch of new product models.

Under the eMMC standards, a memory cell chip and a control chip are packaged together and thus integrated to form a single chip, thereby resulting in advantages thereof as follows: sparing parts and components, reducing circuit board area requirement, and thus applying to lightweight thin mobile device products, such as smartphones, tablet computers, and notebook computers. Hence, as smartphones and mobile devices are all the rage, the eMMC standards are increasingly eye-catching to manufacturers and thus are widely accepted by the manufacturers nowadays. Accordingly, the eMMC standards have become the mainstream standards of embedded memory, and eMMC4.3 is the latest version.

Under the eMMC standards in use today, not only is it necessary to change the memory cell chip in order to alter eMMC storage capacity, but multiple storage units in an embedded storage device communicate with a processor separately and thus are regarded as different disks at the computer system end.

SUMMARY

In view of the aforesaid prior art, the present invention provides an embedded storage device equipped with a relay bus and adapted to enabling communication between storage units so as to improve conventional eMMC specifications and treat multiple storage units in the embedded storage device as single disks at a computer system end.

The present invention provides an embedded storage device for use with a computer device. The embedded storage device comprises a microprocessor, a master storage unit, a slave storage unit, and a relay bus. The microprocessor provides a command and creates data transmission link to the computer device. The master storage unit has at least a master data pin, and a master control pin. The master data pin is coupled to the microprocessor to transmit data. The master control pin receives a command signal from the microprocessor. The slave storage unit has at least a slave data pin. The slave data pin is coupled to the microprocessor to transmit data. The relay bus is coupled to the master storage unit and the slave storage unit to transmit the command signal from the master storage unit to the slave storage unit.

The master storage unit further comprises a master clock pin. The master clock pin is coupled to the microprocessor and receives the clock signal form the microprocessor. The slave storage unit further comprises a slave clock pin. The slave clock pin is coupled to the microprocessor and receives the clock signal from the microprocessor.

The relay bus enables the communication between the master storage unit and the slave storage unit. Hence, as soon as the microprocessor generates and transmits a command signal to the storage units, the master storage unit determines whether the command signal is for use in controlling and accessing the master storage unit or the slave storage unit, sends the command signal to the slave storage unit by means of the relay bus, and sends a response signal to the microprocessor by means of the master control pin.

The advantages of the embedded storage device of the present invention are as follows: with a relay bus serving as the bridge of communication between a master storage unit and a slave storage unit, a microprocessor of the embedded storage device merely needs to send a command signal to the master storage unit, so as for the master storage unit to determine whether the command signal is targeted at the master storage unit or targeted at the slave storage unit, send the command signal to the slave storage unit, and send a response signal to the microprocessor to respond to the command signal.

As the microprocessor only sends the command signal to a single address of the master storage unit, multiple storage units of the embedded storage device at a computer system end are treated as single disks. Due to disk integration mechanism of the present invention, the embedded storage device is conducive to combining small storage spaces of multiple storage units to form a single large storage space, achieving the effect of disk array approximately, and increasing the storage space of the embedded storage device without increasing the difficulty in hardware package.

BRIEF DESCRIPTION OF THE DRAWINGS

Features, implementation, and advantages of the present invention are hereunder illustrated with preferred embodiments in conjunction with the accompanying drawings, in which.

DETAILED DESCRIPTION OF THE PREFERRED EMBODIMENTS

Figure 1:
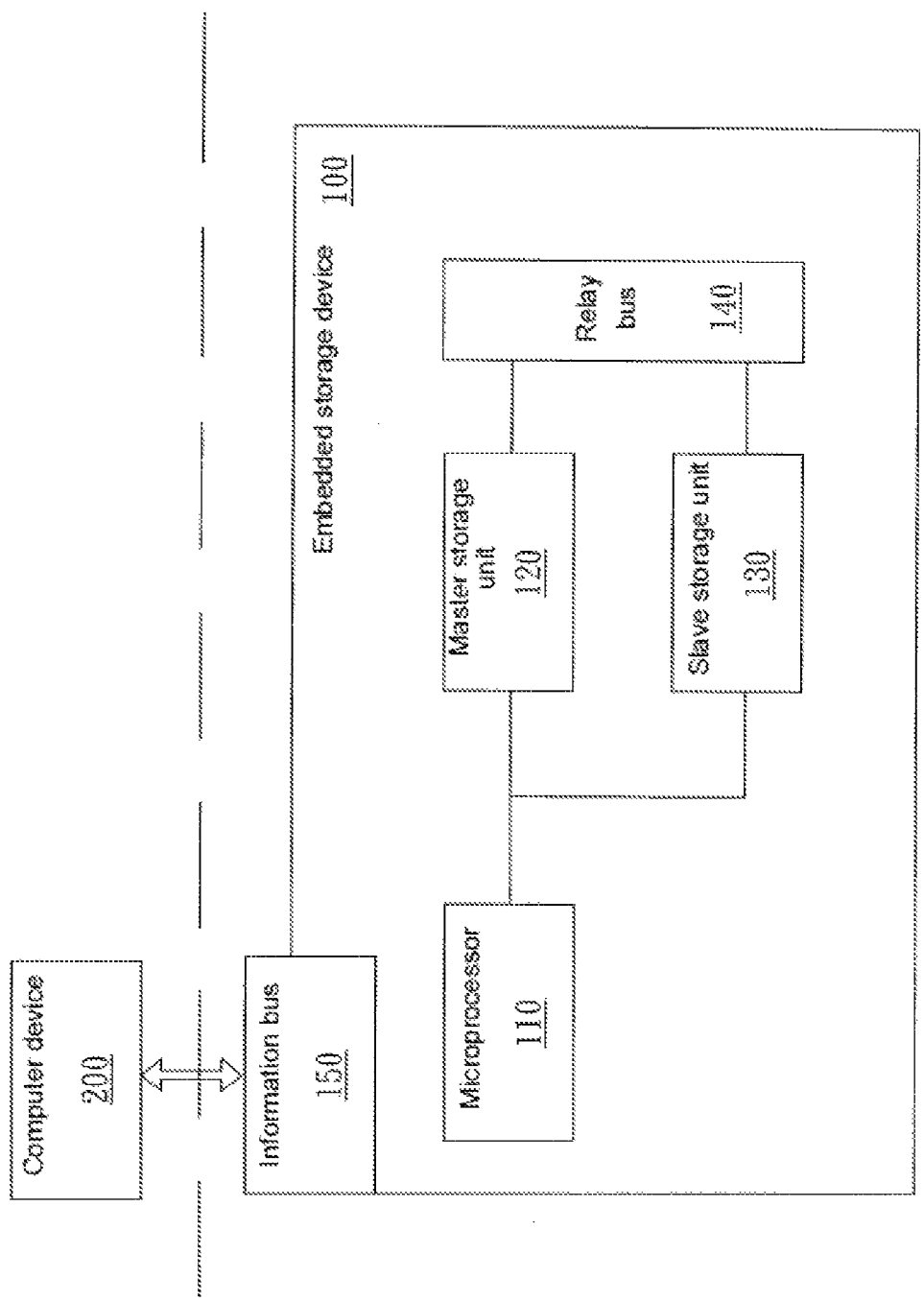
FIG. 1 is a schematic view of an embedded storage device according to the first embodiment of the present invention.

Referring to FIG. 1, in the first embodiment of the present invention, an embedded storage device 100 is adapted for use with a computer device 200 to provide storage space, such that the computer device 200 can access data.

Referring to FIG. 1, the embedded storage device 100 comprises a microprocessor 110, a master storage unit 120, a slave storage unit 130, a relay bus 140 and an information bus 150.

Referring to FIG. 1, the microprocessor 110, which serves as a control center of the embedded storage device 100, is loaded with a firmware and is capable of executing the firmware. The microprocessor 110 provides a clock signal for setting the operating frequency of the embedded storage device 100. The microprocessor 110 is connected to the computer device 200 through the information bus 150 to create data transmission link and provide an access space for the computer device 200 to load in accordance with a handshake protocol of an external storage device. Given the link through the information bus 150, the microprocessor 110 can receive an instruction from the computer device 200 to enable the computer device 200 to access data in the access space.

Referring to FIG. 1, the master storage unit 120 and the slave storage unit 130 are exemplified by storage modules which comply with eMMC (Embedded MultiMediaCard) standards and hardware specifications, but are not limited thereto.

The master storage unit 120 has a master clock pin, at least a master data pin, and a master control pin. The master clock pin is coupled to the microprocessor 110 and adapted to receiving the clock signal from the microprocessor 110. The master control pin is coupled to the microprocessor 110 and adapted to receiving a command signal from the microprocessor 110. The at least a master data pin is coupled to the microprocessor 110 to enable data transmission.

The slave storage unit 130 comprises a slave clock pin and at least a slave data pin. The slave clock pin is coupled to the microprocessor 110 to receive the clock signal from the microprocessor 110. The at least a slave data pin is coupled to the microprocessor 110 to enable data transmission. If the slave storage unit 130 is a storage module which complies with eMMC standards and hardware specifications, the slave storage unit 130 will still have a slave control pin, but the slave control unit 130 will directly receive a control signal from the microprocessor 110.

Figure 2:
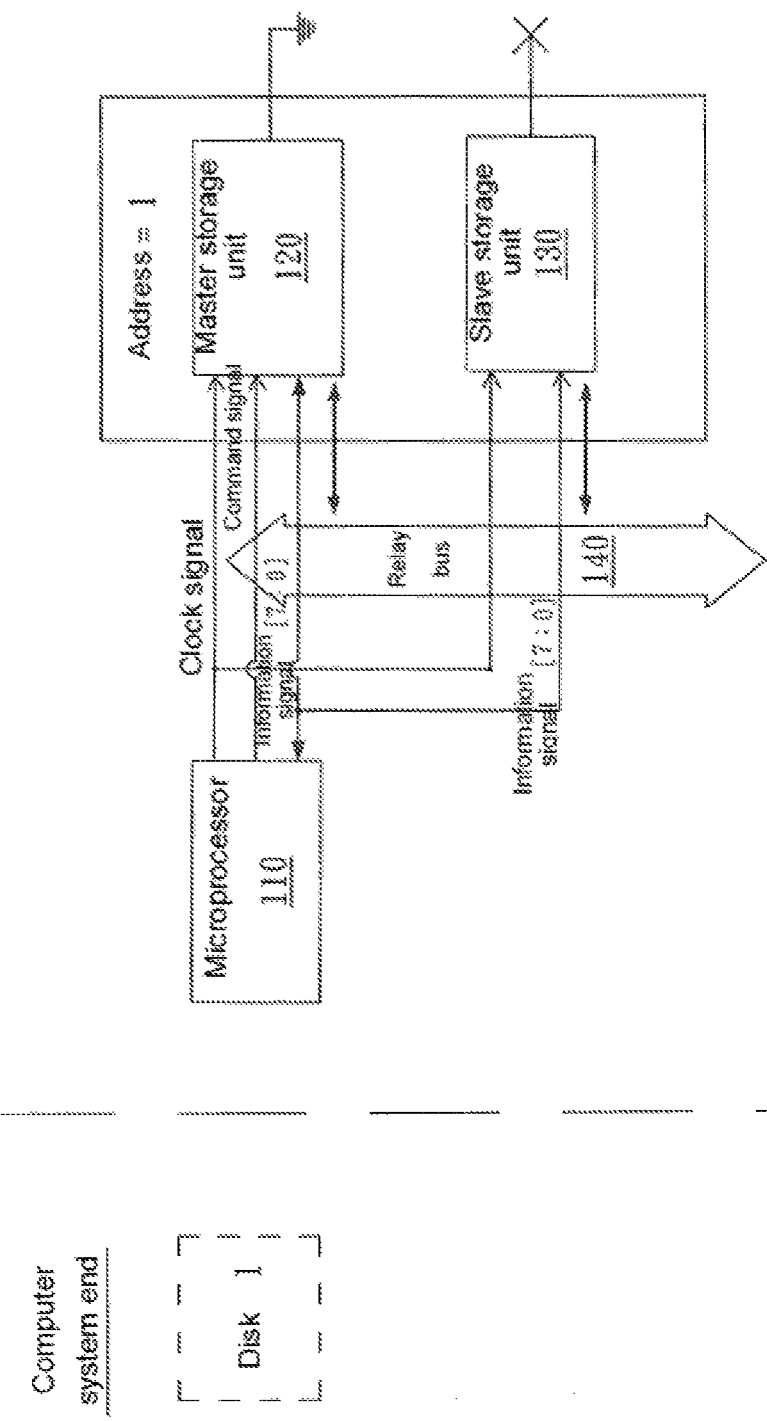
FIG. 2 is a schematic view of the embedded storage device according to the first embodiment of the present invention.

Referring to FIG. 1 and FIG. 2, the relay bus 140 is coupled to the master storage unit 120 and the slave storage unit 130 to enable communication between the master storage unit 120 and the slave storage unit 130.

A memory cell chip of the master storage unit 120 or the slave storage unit 130 includes, but is not limited to, NAND flash memory. Under the eMMC standards, the master storage unit 120 or the slave storage unit 130 has eight data pins, namely data pin 0 through data pin 7, but the present invention is not limited thereto. The eMMC standard versions differ in terms of functions, such as write protected and debug.

Referring to FIG. 1 and FIG. 2, as soon as the embedded storage device 100 is connected to the computer device 200 through the information bus 150, the microprocessor 110 receives a handshake instruction and an access request from the computer device 200 through the information bus 150.

Only the master storage unit 120 links and communicates with the microprocessor 110 via the master control pin; hence, from the perspective of the microprocessor 110, the master storage unit 120 or the slave storage unit 130 is regarded as a single physical storage unit which has a single address (RCA=1). In response to this, the microprocessor 110 generates and sends the command signal to the master storage unit 120, and then a firmware program of the master storage unit 120 determines whether the command signal accesses and controls the master storage unit 120 or accesses and controls the slave storage unit 130 according to the packet of the command signal.

If the firmware program of the master storage unit 120 determines that the command signal is attributed to the master storage unit 120 itself, the master storage unit 120 will automatically execute the command signal and send a response signal to the microprocessor 110. If the firmware program of the master storage unit 120 determines that the command signal is attributed to the slave storage unit 130, the command signal will be sent from the master storage unit 120 to the slave storage unit 130 via the relay bus 140 and executed by the slave storage unit 130, and a response signal will be sent from the relay bus 140 to the master storage unit 120 and then from the master control pin to the microprocessor 110. If the command signal is for use in transmitting and accessing data of the master storage unit 120 or the slave storage unit 130 of the embedded storage device 100 by the computer device 200, the master storage unit 120 or the slave storage unit 130 will transmit the data to the microprocessor 110 by means of the at least a master data pin or the at least a slave data pin, respectively, or receive the data from the microprocessor 110.

In this embodiment, the embedded storage device 100 uses the master storage unit 120 as a command window with respect to the microprocessor 110 and responds to and transmits the command signal to the slave storage unit 130 by means of the relay bus 140. Hence, the microprocessor 110 only needs to operate in conjunction with the master storage unit 120 having a single address, whereas the firmware program of the master storage unit 120 determines whether the command signal is attributed to the master storage unit 120 or the slave storage unit 130, thereby simplifying the process flow of the command signal.

In addition, both the master storage unit 120 and the slave storage unit 130 are located at a single address; hence, from the perspective of the computer system end executed by the computer device 200, the storage space of the embedded storage device 100 is regarded as a single disk, and the computer device 200 sends an instruction to the single disk, such that the microprocessor 110 and the master storage unit 120 determine the operation of accessing the master storage unit 120 or the slave storage unit 130.

Figure 3:
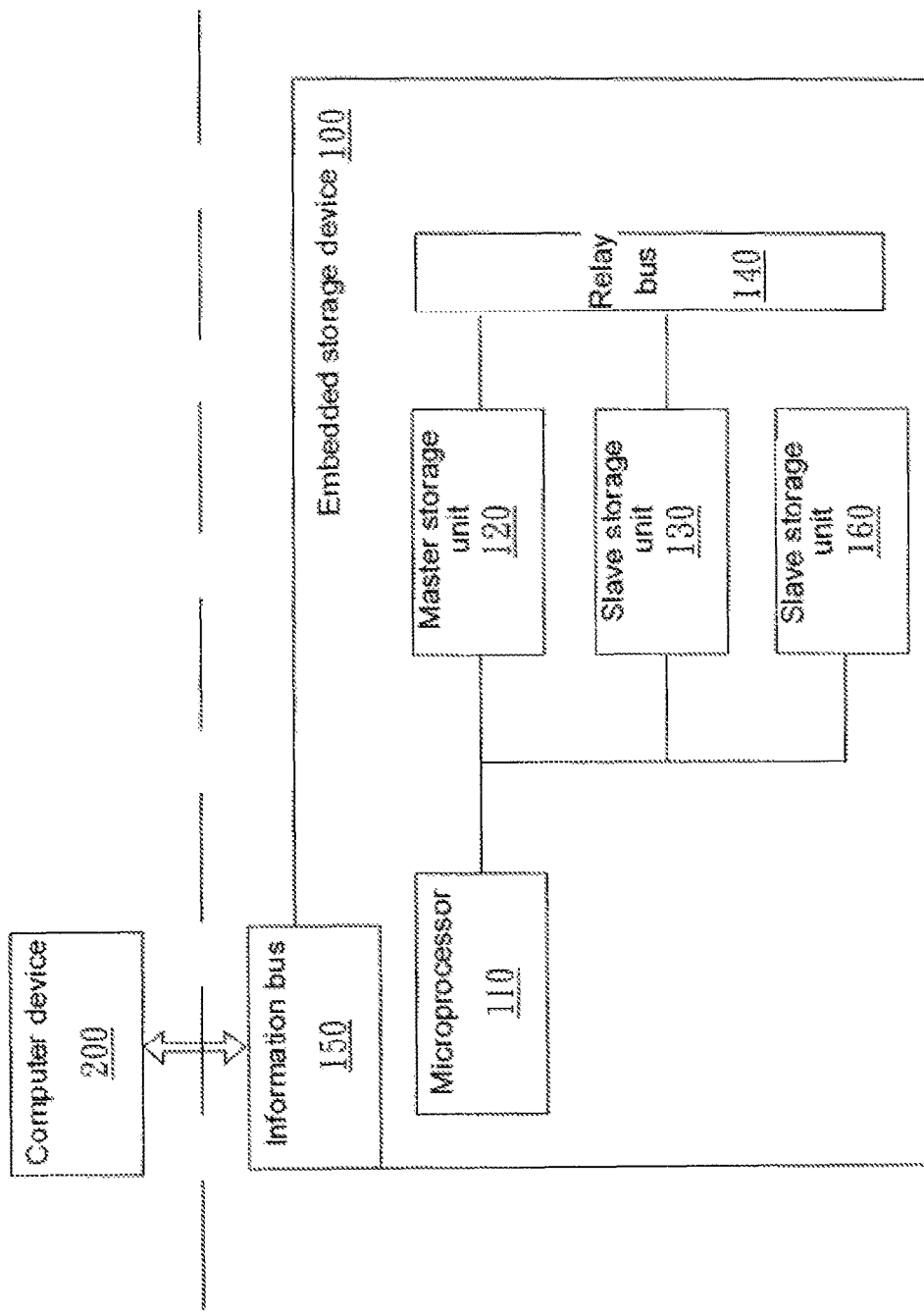
FIG. 3 is a schematic view of the embedded storage device according to the second embodiment of the present invention.

Referring to FIG. 3, there is shown a schematic view of the embedded storage device 100 according to the second embodiment of the present invention. The second embodiment is substantially similar to the first embodiment but still distinguished from the first embodiment by the following technical features. In the second embodiment, the embedded storage device 100 comprises at least two slave storage units 130, 160. The slave storage units 130, 160 each have a slave clock pin and a slave data pin which are coupled to the microprocessor 110. The slave clock pin and the slave data pin receive the clock signal from the microprocessor 110 and perform data transmission. The master storage unit 120 and the slave storage units 130, 160 communicate by means of the relay bus 140.

Figure 4:
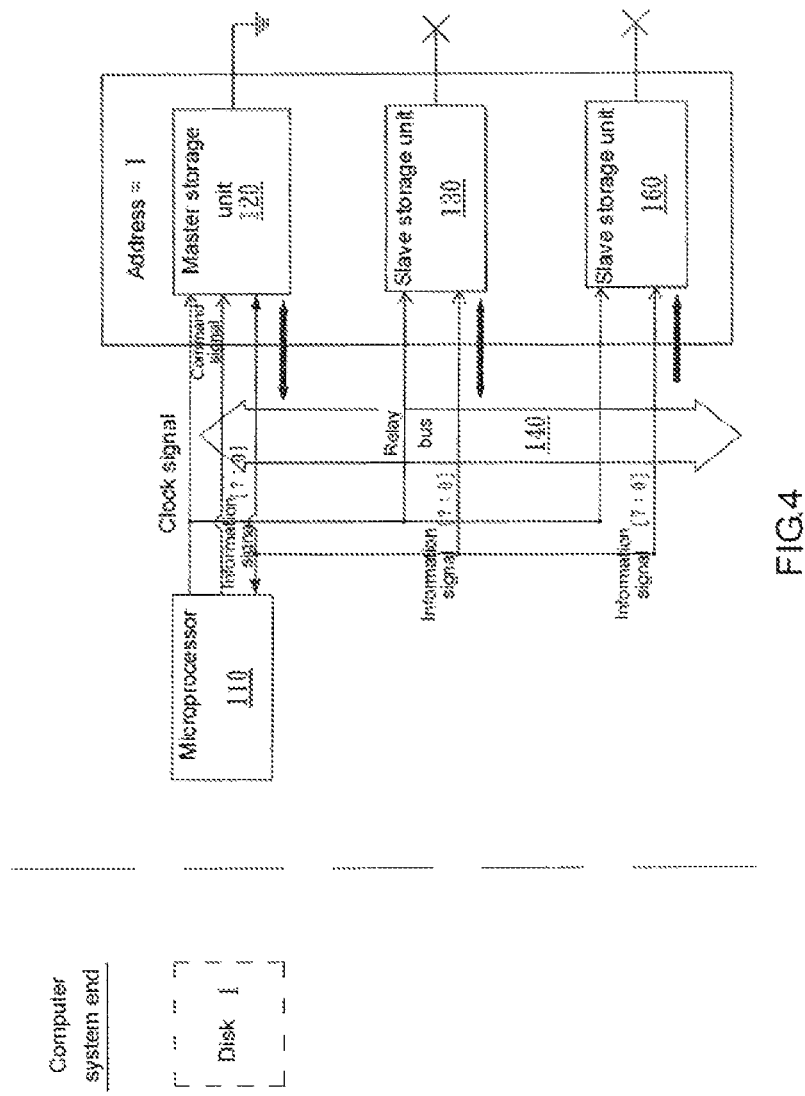
FIG. 4 is a schematic view of the embedded storage device according to the second embodiment of the present invention.

Referring to FIG. 3 and FIG. 4, the master storage unit 120, but not the slave storage units 130, 160, receives a command from the microprocessor 110 by means of the master control pin and responds to the command. As soon as the microprocessor 110 receives an instruction from the computer device 200, the microprocessor 110 generates and sends the command signal to the master storage unit 120. Afterward, the firmware program of the master storage unit 120 determines whether the command signal is for use in controlling and accessing the master storage unit 120 or for use in controlling and accessing the slave storage units 130, 160 according to the packet of the command signal, and then the command signal is sent from the master storage unit 120 to the related storage unit by means of the relay bus 140 and executed, thereby allowing a response signal to be generated and sent from the master storage unit 120. The second embodiment has the same process flow as the first embodiment does and thus is not described in detail herein for the sake of brevity.

Similarly, in the second embodiment, both the master storage unit 120 and the slave storage units 130, 160 are located at a single address; hence, from the perspective of the computer system end executed by the computer device 200, the storage space of the embedded storage device 100 is regarded as a single disk, and the computer system sends an instruction to the single disk, such that the microprocessor 110 and the master storage unit 120 determine the operation of accessing the master storage unit 120 or the slave storage units 130, 160.

In the second embodiment, the number of slave storage units is not restrictive to two, as persons skilled in the art can change or increase the slave storage units to meet hardware design needs, provided that the change or increase in the slave storage units does not depart from the spirit embodied in the present invention.

The embedded storage device of the present invention is characterized in that: a relay bus serves as the bridge of communication between a master storage unit and a slave storage unit; and a microprocessor of the embedded storage device only needs to send a command signal to the master storage unit. The master storage unit determines whether the command signal is targeted at the master storage unit itself or the slave storage unit, sends the command signal to the slave storage unit or handles it, and sends a response signal to the microprocessor in response to the command signal.

The microprocessor merely sends the command signal to the master storage unit with a single address; hence, from the perspective of the computer system end, multiple storage units of the embedded storage device are each regarded as a single disk. Given the disk integration mechanism of the present invention, the embedded storage device is conducive to combining small storage spaces of the multiple storage units to form a single large storage space, achieving the effect of disk array approximately, increasing the storage space of the embedded storage device without increasing the difficulty in hardware package, and thus meeting the requirements of the new-generation mobile devices. Due to the disk integration mechanism and relay bus-based communication, the embedded storage device of the present invention operates in various storage modes, such as JBOD (Just a Bunch of Disks), Stripe Disk, and Mirror Disk.

Although embodiments of the present invention are described above, they are not restrictive of the present invention. Persons skilled in the art can make some changes to the present invention in accordance with shapes, structures, features, and quantity recited in the claims of the present invention, provided that the changes thus made do not depart from the spirit and scope of the present invention. Accordingly, the patent protection for the present invention should be defined by the appended claims.

What is claimed is:

1. An embedded storage device adapted for use with a computer device, the embedded storage device comprising:
   a microprocessor configured to provide a command signal and create data transmission link to the computer device;
   a master storage unit having:
      at least a master data pin coupled to the microprocessor and configured to transmit data; and
      a master control pin configured to receive the command signal from the microprocessor,
   a slave storage unit having:
      at least a slave data pin coupled to the microprocessor and configured to transmit data, and
   a relay bus coupled to the master storage unit and the slave storage unit and configured to transmit the command signal from the master storage unit to the slave storage unit.

2. The embedded storage device of claim 1, wherein as soon as the microprocessor generates and sends the command signal to the master storage unit, the master storage unit determines whether the command signal is for use in controlling and accessing the master storage unit or the slave storage unit, sends the command signal to the slave storage unit by the relay bus, and sends a response signal to the microprocessor by the master control pin.

3. The embedded storage device of claim 1, wherein the master storage unit further comprises a master clock pin coupled to the microprocessor and configured to receive a clock signal, and the slave storage unit further comprises a slave clock pin coupled to the microprocessor and configured to receive the clock signal.

4. The embedded storage device of claim 1, wherein the slave storage unit send a response signal to the master storage unit via the relay bus, and then the response signal is sent from master storage unit to the microprocessor.

5. The embedded storage device of claim 1, wherein the microprocessor is a system-on-a-chip (SoC).

6. The embedded storage device of claim 1, wherein the master storage unit and the slave storage unit are NAND flash memory.

7. The embedded storage device of claim 1, further comprising an information bus connected to the computer device.

* * * * *